United States Patent Office 3,573,014
Patented Mar. 30, 1971

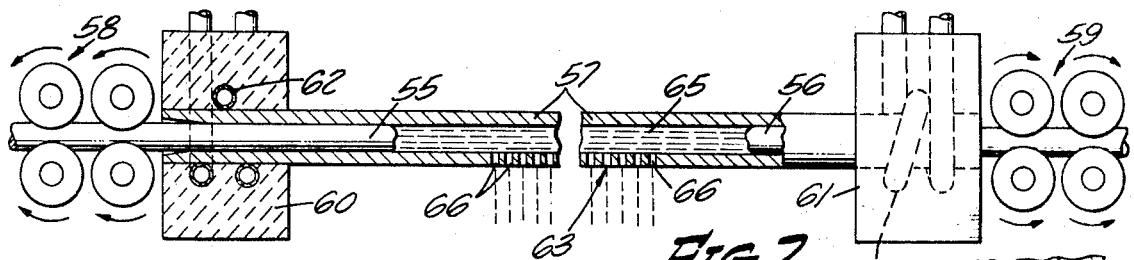
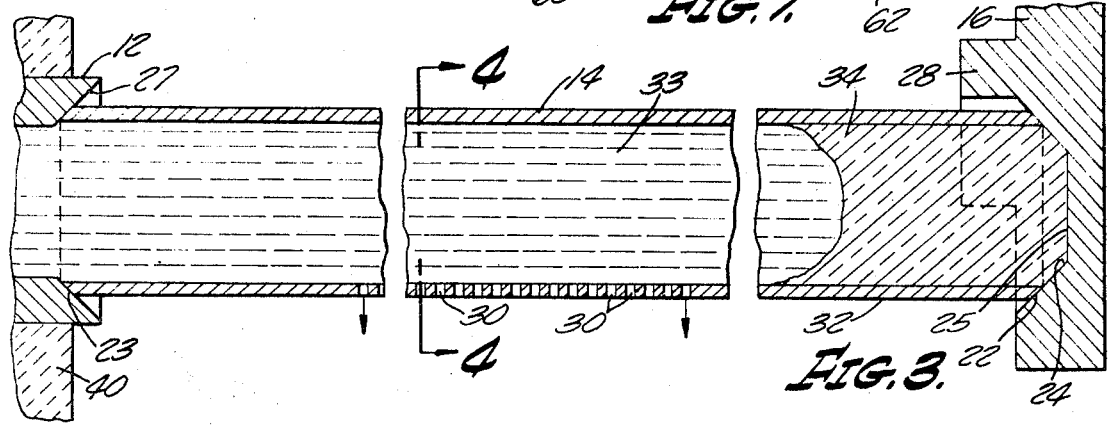
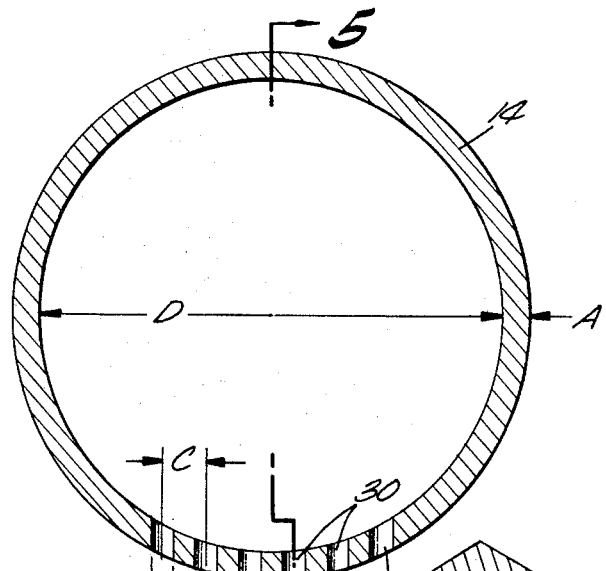
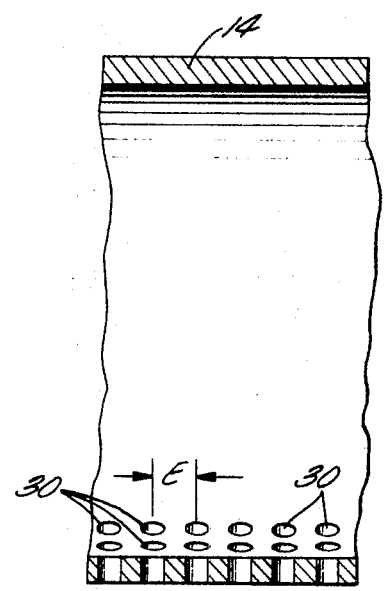
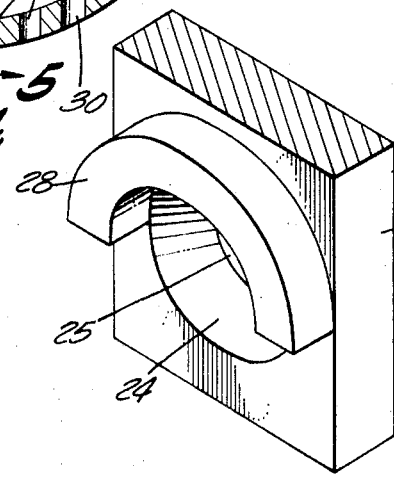
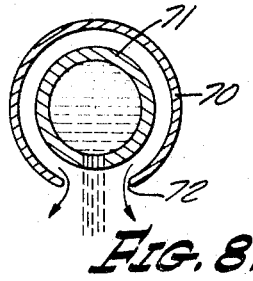
INVENTORS.
HOMER C. AMOS
EDWARD T. STRICKLAND
BY
Lyon & Lyon
ATTORNEYS

3,573,014
APPARATUS AND PROCESS FOR EXTRUDING GLASS FIBERS
Edward T. Strickland and Homer C. Amos, Palm Springs, Calif., assignors to PPG Industries, Inc., Pittsburgh, Pa.
Continuation of application Ser. No. 556,800, May 13, 1966. This application Jan. 8, 1970, Ser. No. 3,558
Int. Cl. C03b 37/00; B23c 23/00
U.S. Cl. 65—1
20 Claims

ABSTRACT OF THE DISCLOSURE

Disclosed herein are apparatus and methods for extruding fibers from material such as glass. The basis for enabling the realization of high production of glass fibers in a practical and efficient manner are set forth, including pressures involved, sizes and lengths of orifices, problems of separation, and other parameters. The bushing configurations disclosed, such as tubular, hemispherical and other shapes, enable the bushing to withstand the pressures and temperatures involved without requiring excessively thick bushings, and enable separation and temperature uniformity without bushing deformation and elongation of orifices. Additionally, specific forms of bushings and feeder apparatus are disclosed, including a tubular form of bushing to which solid glass may be applied. Along with the disclosed apparatus, methods and fiber glass production are disclosed wherein orifices sufficiently closely spaced are used so that glass egressing therefrom would tend to coalesce when only a nominal pressure head is used, but the pressure is increased to overcome the effect of surface tension to cause separation of the glass into discrete streams, and then the pressure may be reduced but maintained sufficiently high to prevent coalescing while still maintaining separation of the streams at a high flow rate.

---

This application is a continuation of Ser. No. 556,800, filed May 13, 1966, now abandoned.

This invention relates to an apparatus and process for extruding fibers, and more particularly for extruding fibers from a high temperature meltable material such as glass.

Fibers and filaments are produced from many substances, and in recent years there has been considerable activity in the production of filaments from glass to produce fiber glass. Fiber glass has many uses including insulation, yarn, glass reinforced plastic, and so forth. In the production of fiber glass, typically molten glass flows through nozzles or tips in a "bushing" as fibers or filaments, which then are cooled and drawn onto a winding reel or forming tube. The equipment for melting the glass, headers or manifolds for feeding the molten glass to the bushings, the bushings, and associated equipment are massive in size. Elaborate temperature control and insulation are utilized to maintain the bushings at a precise temperature. The bushings and headers are made from expensive materials, such as platinum, and represent a tremendous investment, in addition to the high cost of the other associated and control equipment. Repair and replacement of the bushings is difficult and time consuming.

As a result of the extreme coalescing characteristic of liquid glass, conventional fiber glass forming equipment utilizes bushings having large, complex, individually fabricated and widely spaced orifice nipples to obtain the necessary separation of the drawn fibers. Usually, each bushing provides one end of roving, that is, 204 fibers or filaments. Several filaments generally break during each run of one pound of glass, and when a filament breaks a large drop of glass forms. If this drop touches neighboring filaments, the neighboring filaments likewise are broken in a rapidly widening ring. The orifices must be spaced widely enough to prevent this occurrence. When a one pound run is finished and the drawing process has ceased, the next run starts anew with a full complement of 204 filaments. This is accomplished by allowing a waiting period during which time a drop is formed at each nozzle by the oozing glass, and each drop must weld to the neighboring drops so that the filaments broken during the previous run will be caught and restarted. Accordingly, it is generally required that spacing between the orifices be more than the radius of a drop but less than the diameter of a drop.

It is well known that the viscosity of glass at and near fiber forming temperatures changes rapidly with slight changes in temperature. When flowing glass is cooled somewhere along its flow path, channeling of the flow results unless great care is exercized to maintain temperature uniformity. The highly unstable channeling characteristic of flowing glass causes serious flow-rate variations. The hotter and lower viscosity glass begins to flow faster carrying more and more heat to its point of egress, while the cooler and slower flowing glass cools off more and becomes even slower in its flow rate. Such instability cycles are untenable in drawing glass fibers. A certain amount of flow rate instability is inherent in the bushing assembly design in present filament drawing equipment. This instability results from irregularities in the shape of nipples which cause irregularities in loss of heat energy through radiation and convection and gain of heat energy through resistance heating. The surface areas of the bushings are so large that insulation is required wherever possible to prevent excessive total heat loss, and this in turn causes local temperature increases. However, the total orifice area cannot be insulated and is exposed to the lower temperatures of the room in which the equipment is operating. Consequently, this area suffers considerably greater energy losses than elsewhere in the overall system. The higher glass temperature in the insulated area and the lower temperature of the glass in the orifice area results in localized temperature differences which in turn cause glass flow irregularities through the nozzles, as well as cause channeling which further aggravates the problem.

Accordingly, practical production facilities for producing fiber glass on such apparatus requires careful and precise temperature control. Great care is exercised through the use of multiple thermocouple temperature sensing probes controlling current regulators which in turn control the current to the bushings to provide an average temperature generally suitable for fiber forming. In spite of careful temperature control, the residual deficiency of the apparatus still results in a certain rate of fiber breakage. Additionally, glass is to a large extent pulled out of the orifices by the drawing tension of the present systems, and since this tension is markedly affected by small variations in the external environment, filament uniformity is adversely affected and breakage occurs.

Filament breakage is costly and time consuming. As a compromise, many fiber drawing facilities provide only short runs of filaments, but even then restarting after a run is time consuming and must be performed carefully. A typical run, called a "cake" consumes approximately a pound of glass, and a roving made from 30 cakes, for example, typically weighs approximately 30 pounds. Consequently, typical roving packages are small, 30 to 35 pounds, and the handling and transportation of such small packages for ultimate use, such as in laminating machines, is costly. Also, in order to maintain a continuous production without interruption, the tail roving of a spool being used is tied to the head of a new roving spool thereby causing a joining knot. If this knot subsequently is drawn into a laminating machine, rejection of a finished part frequently occurs since the joining knot often protrudes through an otherwise smooth surface of the laminate. This results not only in a higher roving cost, but also in a higher lamination cost.

Furthermore, the labor investment in a conventional glass melting and bushing assembly is too great to tolerate any components other than those having the longest service life, thus requiring the use of expensive materials, such as platinum. The large complex platinum devices cost thousands of dollars per end. As a result of these costs, and the other costs involved, careful controls in the use of the expensive materials are provided as well as safeguards in their use, such as vaults. Because of the size and cost of current fiber drawing equipment, integrated production lines with both the fiber forming equipment and laminating equipment are impractical, and current fiber equipment makes experimentation with new materials and new fiber drawing techniques almost prohibitively expensive.

Accordingly, it is an object of this invention to provide an improved apparatus for producing fibers from a high temperature meltable material.

It is an additional object of this invention to provide apparatus which is relatively small, inexpensive and economical to operate for producing glass fibers or filaments.

Another object of this invention is to provide a very simple apparatus for producing fibers.

A further object of this invention is to provide a simple apparatus for producing glass fibers, and which may be quickly and simply repaired.

An additional object of this invention is to provide an improved means for producing fibers from a high temperature meltable material.

A still further object of this invention is to provide an improved process for producing fibers from a high temperature meltable material.

Another object of this invention is to provide a process for producing glass fibers in a relatively simple and inexpensive manner.

These and other objects and advantages of the present invention will become more apparent upon reference to the accompanying description and drawings in which:

FIG. 3 is an enlarged cross-sectional view illustrating in greater detail a portion of the apparatus shown in FIGS. 1 and 2;

FIG. 4 is a cross-sectional view taken along a line 4—4 of FIG. 3;

FIG. 5 is a cross-sectional view taken along a line 5—5 of FIG. 4;

FIG. 6 is a partial perspective view of a portion of the apparatus shown in FIGS. 1 through 3;

FIG. 7 is an elevational view, partially in section, of an alternative apparatus according to this invention; and FIG. 8 is a cross-sectional view illustrating a modification of apparatus according to this invention.

Figure 1:
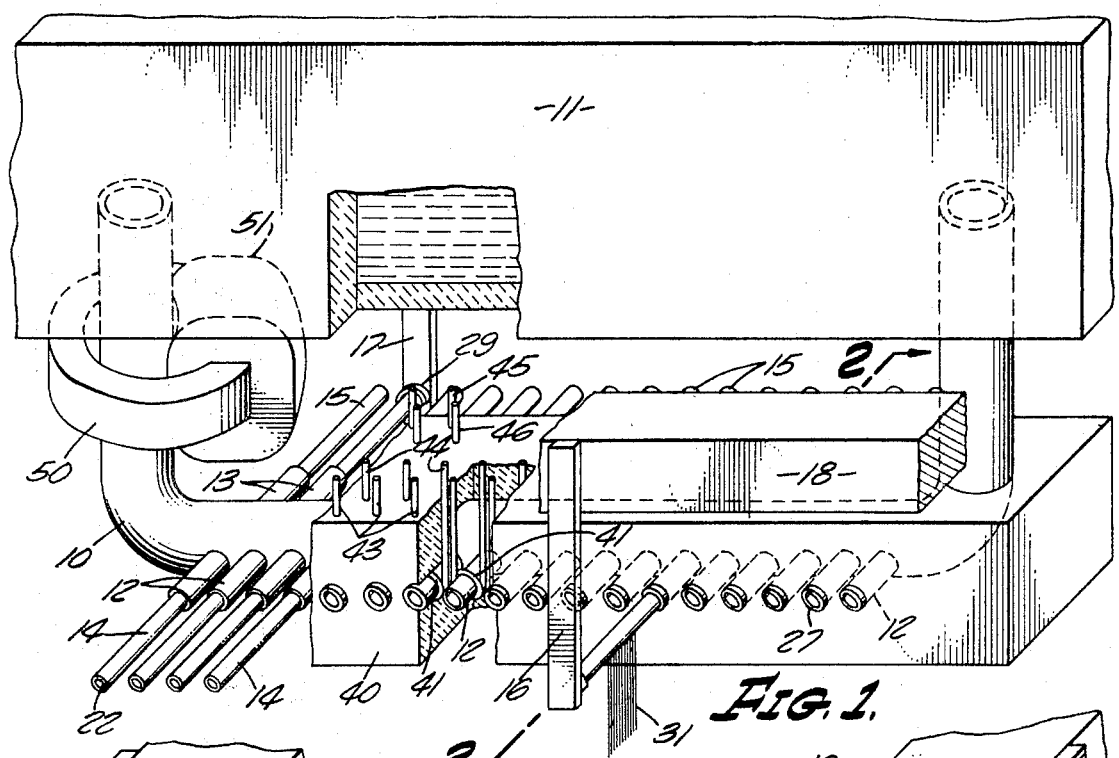
FIG. 1 is a partial perspective view, with portions cut away, of apparatus according to the present invention.
Figure 2:
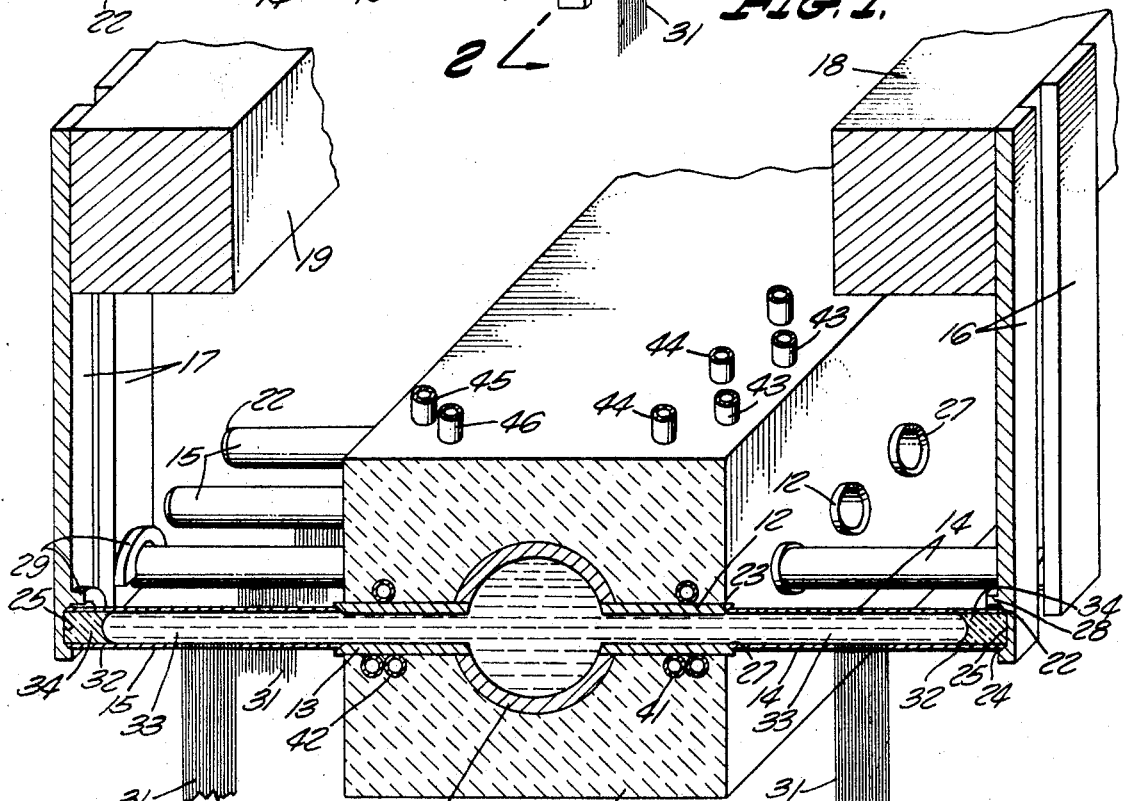
FIG. 2 is a view taken along a line 2—2 of FIG. 1.

According to an exemplary embodiment of the concepts of the present invention, a high temperature meltable material such as glass is heated to a temperature at which it becomes liquid, and is forced into a bushing having a plurality of closely grouped simple and tiny passages or orifices thereby causing extrusion of the glass as fibers or filaments through the orifices. The glass may be heated in a furnace and pumped or otherwise forced into the bushings, or solid glass may be forced into a bushing which is at a temperature sufficient to melt the glass. The orifice area is curved with the lowest point thereof in the orifice area, such as arced in the direction of filament extrusion. A typical bushing may include two hundred and four closely grouped orifices within an area of a small fraction of an inch for extruding two hundred and four filaments to provide one end of roving.

Referring now to the drawings, and particularly FIGS. 1 through 6, apparatus according to this invention is shown. A manifold 10 is coupled with a furnace 11 or the like which supplies molten glass into the manifold 10. Although not shown, a pressure source, such as a viscosity pump, preferably is provided to apply suitable pressure to the liquid glass in the manifold 10, or in some instances the pressure head provided by the elevation of the liquid glass is sufficient. The pump also may serve to mix and homogenize the liquid glass as well as debubble the glass, i.e., cause the release of air bubbles.

A plurality of feeders 12 and 13 are secured to and extend from each side of the manifold 10 to convey liquid glass from the manifold to respective bushings 14 and 15. Both the manifold and feeders may be made of nickel clad molybdenum, and the feeders may be screwed into the manifold. The bushings 14 and 15 are held in place by respective electrical current carrying springs 16 and 17. The springs 16 are secured to a bus bar 18, and the springs 17 are secured to a bus bar 19, both bus bars being suitably supported in the positions shown in FIG 2. The bus bars are connected to a source of electrical current which is passed from one bus bar to the other through the springs 16 and 17, bushings 14 and 15, feeders 12 and 13 and the manifold 10 to maintain the bushings 14 and 15 at a sufficient temperature to keep the glass therein liquid. Although only thirty-six feeders and bushings are shown in FIG. 1, more or less may be used and typically sixty are provided for the extrusion of sixty strands or "ends" of two hundred and four fibers each thereby providing a complete sixty-end roving.

Each bushing 14 and 15 preferably has beveled ends 22 and 23 as shown in FIG. 3. The end 22 of each bushing mates with the beveled or frusto-conical surface 24 provided by a socket 25 (note FIGS. 3 and 6) in the lower end of each spring, such as the spring 16 shown in FIG. 3. The end of each feeder has a beveled surface 27 with which the end 23 of the respective bushing mates. Preferably, the ends 22 and 23 of the bushings are cut at a forty-five degree angle, with the surfaces 24 and 27 likewise being beveled at a forty-five degree angle. As will appear subsequently, each of the bushings 14 and 15 preferably is a thin walled tube and thus the bevels at the ends thereof effectively are spherical thereby compensating for small amounts of misalignment. Half-cup guides 28 and 29 are provided on the respective springs 16 and 17 to facilitate insertion of the bushings. It will be appreciated that this arrangement along with the springs 16 and 17 greatly facilitates removal and replacement of a bushing or bushings.

Each bushing 14 and 15 includes a plurality of orifices or holes 30 intermediate the ends thereof as shown in FIGS. 3 through 5 through which the liquid glass is extruded as a plurality of fibers or filaments 31. These holes are provided in the bottom of the bushing away from the outer end 32 of the bushing inasmuch as this end is cooler than the rest of the bushings, and the liquid glass 33 solidifies at this end as indicated by a reference numeral 34. Typically, the length of the bushing is five or more times the longitudinal length of the orifice or hole area.

The manifold 10 and feeders 12 and 13 are covered with insulation 40. Cooling coils 41 and 42 are provided about the respective feeders 12 and 13, with the ends 43 and 44 of the coils 41 and the ends 45 and 46 of the coils 42 extending through the insulation 40. The insulation 40 serves to restrict the heat dissipation from the manifold and feeders. No insulation is provided on the bushings 14 and 15. The coils 41 and 42 may be connected with a source of water to aid in cooling the glass within the respective feeders 12 and 13 when it is desired or necessary to change any one or more of the bushings 14 and 15. The springs 16 and 17 may be made of any suitable electrical conductor which is rigid enough to maintain the respective bushings in place at the liquid glass pressures used. Molybdenum is suitable and even copper may be used when low pressures are used since less force is required to keep the bushings in place and sealed with the feeders.

If desired, a transformer core 50 may be provided about the manifold 10 as shown in FIG. 1. A primary winding 51 is wound on the core 50, with the manifold 10 serving as the secondary of the transformer. Complete secondary current circuit is provided through the furnace, and the secondary current through the manifold maintains the manifold and the glass therein hot.

As one example of a suitable arrangement, the bushings, such as a bushing 14 shown in FIGS. 3 through 5, may be made from a molybdenum tube clad with a nickel-chromium alloy, such as that sold under the trade name Inconel. The wall thickness A is 0.020 inch, the hole or orifice diameter B for each of 204 holes is 0.013 inch, the center-to-center circumferential spacing C is 0.020 inch, the internal diameter D of the tube is 0.25 inch, and the center-to-center longitudinal spacing E is 0.025 inch. The bushing is ten inches long. Type E glass having an approximate composition of 53% silica, 18% alumina, 7% bora, 4.5% magnesia, and 17% calcia was heated to approximately 2150° F. and forced into the bushing by a bubble rejecting constant pressure viscosity pump in the glass providing a pressure of 500 p.s.i. to start the extrusion of filaments. After extrusion begins and separation of the filaments occurs, the pressure may be reduced to approximately 150 p.s.i. A starting pressure of 200 p.s.i. and a running pressure of 50 p.s.i. has been found sufficient for the same type glass at a similar temperature with a 204 hole bushing having an internal diameter D of ⅜ inch, a wall thickness A of 0.025 inch, a hole diameter of 0.018 inch, a center-to-center spacing C and E of 0.030 inch.

Once the filaments are started and separated, the operating requirements are not particularly rigorous. For example, the pressure can be reduced, or the bushings, along with the feeders and manifold, can be rotated or tilted to a desired angle, including upwardly. After separation occurs, the pressure may be lowered in the liquid glass and the fibers remain separated as long as the flow of glass is not interrupted. As noted above, the pressure may be reduced after obtaining initial separation while still maintaining fiber separation. Even though a typical cost for a bushing is only a few dollars, the life span thereof can be increased substantially by the reduction of pressure after initial separation is obtained.

As the fibers are extruded, they are fed to a reel or spool, such as a reel 53. The reel provides a tension on the fibers to attenuate the diameter thereof, or a jet stream of air may be directed toward the fibers to increase the drag thereof. As an example, a filament extruded from 0.010 diameter hole provides a fiber having a diameter of 0.013 inch which then typically is attenuated to 0.0038 inch.

As a result of the extreme miniaturization of the bushings, energy losses from radiation and convection are insignificant and no insulation on the bushings is required. Additionaly, great accuracy in obtaining and maintaining the desired temperatures can be accomplished without any temperature controls because of the heating element function of the small bushings. The only temperature maintaining device required is a simple voltage regulator. Once the desired temperature has been attained with a pyrometer, the voltage regulator maintains that temperature. Since tubing for bushings having a very high degree of dimensional accuracy and cross-section uniformity is readily available, the bushings provides a very suitable heating element, the temperature of which can be precisely controlled solely by the voltage regulator. Although it depends on bushing wall thickness, type of glass, etc., a current of approximately 1800 amperes in the bus bars at four or five volts is suitable for a sixty ended apparatus of the nature shown in FIG. 1. In an exemplary case, the total wattage consumption to melt the glass, including radiation and convection losses, was approximately one-third kilowatt hour per pound. These factors substantially enhance the ability to extrude constant diameter fibers continuously for full days without a single fiber breaking.

FIG. 7 illustrates an alternative form of the invention wherein glass rods 55 and 56 are forced into opposite ends of a bushing 57. Sets of rubber rollers 58 and 59 may be used to drive the respective rods 55 and 56 into the bushing. Alternatively, one end of the bushing 57 may be closed, with a single glass rod being inserted only in the open end. The ends of the bushings 57 are secured in apertures within bus bars 60 and 61, which supply current through the bushings to melt the glass therein. The bus bars are water cooled by cooling coils 62, and may be made of copper with the bushings soldered thereto. Inasmuch as the bus bars 60 and 61 are water cooled and dissipate heat, the ends of the bushings 57 are cooler for a short distance, such as one-fourth inch, from the bus bars. Hence, the orifice area 63 is located intermediate the ends of the bushing rather than adjacent an end thereof. It is to be understood that more than one bushings 57 may be coupled with the bus bars 60 and 61 for receiving plural rods and extruding plural groups of fibers.

When current is applied through the bushings 57, the inner ends of the rods 55 and 56 begin to melt as indicated by a reference numeral 65. Preferably, high driving pressures are applied to the rods 55 and 56 causing the inner ends thereof to flow against the inside wall of the hot bushing thereby causing rapid melting of the glass. The glass is forceably ejected or extruded from the orifices 66 in the orifice area 63. Thus, the bushing 57 acts as a furnace as well as the means for extruding glass filaments. A typical starting pressure against the rods is two to three thousand p.s.i.

Excellent results have been obtained through the use of a molybdenum tube clad with a nickel-chromium alloy and having an inside diameter of one-fourth inch, a length of 29 inches, and a wall thickness of 0.020 inch at a temperature of approximately 2100° F. Two-hundred-and-four 0.010 inch holes were provided on 0.025 inch centers longitudinally and 0.015 inch centers circumferentially. The orifice area was four holes wide and fifty-one holes long. No glass tank or furnace was required since the bushing 57 itself performed the melting function. The glass was introduced in the form of the glass rods 55 and 56 each driven by rubber surfaced rollers. Immediate and stabilized separation of all the filaments was obtained during a substantial number of test runs regardless of the length of each run through the use of one thousand p.s.i. pressure on the rods and with the filaments being extruded downwardly.

Fibers have been made from a wide variety of glass formulations available in rod form. A certain amount of surface effect has been experienced which caused an occasional bubble and resulted in an occasional fiber breakage. This can be prevented by carefully selecting the rods and properly containing and handling the rods to avoid scratching or soiling thereof.

In either of the embodiments shown in FIGS. 1 or 7, the bushings may be made from various materials, such as nickel-chromium alloys, molybdenum, platinum, molybdenum clad with a nickel-chromium alloy, nickrome, Chromel, etc. In large size bushings, the holes may be mechanically drilled. The holes may be radial or parallel to each other. The holes in smaller bushings preferably are provided by arcing. A mosaic of tungsten wires having a diameter approximately 0.001 inch smaller than the desired hole and having sleeving spacers thereon may be used. The bushing is immersed in kerosene and connected to the positive side of a voltage source. The other side of the source is connected to the tungsten wires, and the wires are lowered toward the bushing and arc therewith to thereby blast holes therein. A one-half microfarad capacitor with a hundred and fifty volt source has been then found to provide a sufficient arc. Preferably, the kerosene is vibrated. In this manner, very clean holes can be provided in substantially any conductor within a short period of time. More accurate holes can be provided by using a lower voltage source. The ends of the tungsten wires may be trued by arcing through kerosene to a flat metal plate.

The holes are closely grouped together at such a distance that two drops forming from two holes would touch each other and coalesce into one drop until the pressure is sufficiently increased to cause separation. It is preferred that the holes or orifices have a greater longitudinal spacing than ciricumferential spacing to maximize the burst strength and number of holes which may be provided in the orifice area of the bushing. As can be sen from the foregoing, the orifice area generally is but a small fraction of a square inch, and typical center-to-center spacings may range between approximately one and two-thirds and two and one-half times the hole diameter longitudinally, and approximately one and one-half and one and two-thirds times the hole diameter circumferetially. A particularly suitable bushing is tubular in shape and formed of molybdenum clad with a nickel-chromium alloy such as that sold under the trade name Iconel 702, with a flash of platinum on the outside of the tube to reduce radiation losses.

Preferably, the wall thickness, i.e. the length of the hole, is not greater than two times the diameter of the hole. Although the wall may be thicker, and thus the hole, more pressure is required to drive the liquid glass through the hole because of the increased drag, and the increased pressure of the temperatures involved (which are close to the melting temperature of the bushing itself) may cause rupture of the bushing.

Through the use of a curved orifice area, with the lowest point thereof in the orifice area, such as arced in the direction of filament extrusion, and suitable pressures, it is possible to use only simple small holes or passages and small uninsulated bushings of various shapes. Without an orifice area of this nature, substantially greater, such as fifteen times as much, pressures are required to obtain fiber separation. The sphere is the ideal shape for bushings for optimum strength at the pressures and temperatures involved which otherwise would cause creep and rupture. The next best shape is cylindrical, and various advantages are derived from cylindrical or tubular bushings because a small round tube also is an ideal shape to withstand the pressures and temperatures required, is an easily and accurately reproducible shape, and provides a bushing of ideal temperature uniformity as well as allows the overall apparatus to be substantially reduced in size. Cylindrical is, of course, the preferred shape for bushings used with a glass rod or rods.

Although a tubular bushing is preferable because it is the best shape to withstand high pressures at the temperature involved and is readily obtainable, the orifice area may have other configurations. However, it is important to have the edges of the orifice area higher than the rest of the area. For example, a flattened inverted dome fulfills this requirement. A circular inverted dome-shaped orifice plate has produced excellent fibers over considerable periods of time. A spherical unflattened surface is preferred under most ciircumstances over the flattened dome for enabling separation of filaments and also is a better design for withstanding the required internal bushing pressure.

Other configurations which can stand the pressure are suitable, such as ellipsoidal, in which case the short radius should be very short, i.e., in the order of the diameter of a glass drop, preferably one-fourth inch or less, since this greatly reduces the pressure required to obtain automatic separation of filaments. In the case of a cylinder or elliposoid, the axis of the cylinder, or long axis of the ellipsoid should be horizontal, because deviation from a horizontal position causes a rapid proportional increase in the pressure required for obtaining filament separation. Other suitable shapes are conical and shapes derived from a surface curved in one or two planes.

As long as the orifice area is arcuate and arced or curved in the direction of filament extrusion, along with suitably high pressures, good filaments can be made from a wide range of sizes of holes, spacings and tubes. For example, satisfactory results have been obtained from a one inch inside diameter tube, twenty inches long, having one-sixteenth inch holes on one-eighth inch centers. Five p.s.i. was more than sufficient to force separation of the fibers, and even less pressure was required to sustain separation. The larger the holes and the spacings and the larger the tube, the smaller the amount of pressure that is required for initial separation. The holes were mechanically drilled. However, even though good filaments can be obtained with a tube of this size, it causes higher energy losses and increases the melter-bushing assembly cost. As the holes are made gradually smaller, the pressure required for separation becomes greater until eventually the high speed of the extruding glass causes appreciable erosion of the orifices. For ordinary fiber glass production this tends to place a practical economical limit on the smallness of the hole size for commercial production, but in the case of exotic filaments where the cost is not of particular import there is no theoretical limit to the smallness of the hole. On example of a suitable small test size bushing was a three-sixteenths inch inside diameter, three inch long tube with 0.006 inch diameter holes on 0.012 inch centers.

Since the area of a bushing according to this invention is substantially less than the area of standard bushings, its energy losses from radiation and convection are very low. A flash coat of platinum applied to the outside of the bushing may be used to reduce the energy loss. Because of the symmetry of a tubular bushing there is an insignificant cost involved in the small amount of radiated energy lost. The energy losses are symmetrical over the entire surface of the uninsulated bushing, and provide a continuous thermal uniformity causing the glass to have a proper temperature viscosity homogenuity which is ideal for fiber formation. Heretofore, attempts to improve temperature uniformity have resulted in exposing the orifice area while thermally protecting the remainder of the bushing and providing elaborate temperature control equipment.

The passage or orifice through the nozzle used in a typical prior art bushing is relatively along, for example one-eighth inch, and the diameter thereof is relatively large, generally forty-thousandths to one-eighth inch. These long and large diameter orifices, along with the low pressures employed, result in a substantial mass of molten glass moving relatively slowly through the orifice. The flow rate of glass through orifices of prior art bushings is slow, ranging up to a maximum of one-half inch per second. Thus, there is a long dwell time of the glass in the orifice, generally greatly in excess of two-hundred-and-fifty milliseconds. As a result, there is a substantial temperature difference, such as 100° F., from one end to the other of the orifice thereby causing detrimental variations in the glass being formed into a fiber. The elaborate insulation and temperature control equipment previously used have not solved this problem.

On the other hand, with bushings and orifices according to the present invention, it will be appreciated that the dwell time of the molten glass in the orifice as the fiber is originally shaped is substantially less because of the relatively thin wall through which the relatively tiny orifices are provided. The speed with which the glass flows through an orifice according to the present invention is substantially greater than prior art devices. An example is four inches per second for E type glass, which, for an orifice length of twenty-thousandths of an inch, results in a dwell time of five milliseconds. Accordingly, the resulting short dwell time of the small mass of glass within the orifice at any instant of time ensures a relatively constant temperature therethrough. As an example, the temperature difference from end to end of an orifice is a maximum of several degrees Fahrenheit. It thus will be apparent that the glass essentially is violently extruded rather than being pulled out of the orifices by drawing tension, thereby resulting in a very short dwell time within the orifice allowing virtually no structural deformities such as are caused by the large temperature differences along the orifices of prior art devices. Furthermore, channeling of the flowing glass does not occur. Even exterior environmental changes, such as low ambient temperatures at the exterior of the bushing or orifice area, have been found to produce virtually no effect on the resulting filaments.

It also has been found that the use of high pressure to force the liquid glass through simple small orifices eliminates the manifold effect. A pressure drop across the length of an orifice area results in a somewhat different flow rate from holes in different positions along the length of the orifice area. The larger the ratio of tube diameter to orifice diameter, the less noticeable are the flow rate differences. With 0.010 inch holes and one-thousand p.s.i. for instance, the pressure drop across each hole has been found so nearly identical that no orifice flow rate differences could be measured. Additionally by using a constant rate feed mechanism, unbroken near perfect fiber diameter uniformity has been obtained over an entire two-hundred and four filaments for continuous runs of many hours.

In the production and attenuation of fibers, the orifice initially shapes the fiber and the fiber egresses from the orifice essentially in a cone. That is, the portion of the fiber exterior to and adjacent the orifice has a longitudinal conical shape with the apex of the cone essentially having a diameter the same as the finished fiber extending therefrom. With prior art devices the "altitude" or length of the cone generally is only several times the size or diameter of the base; whereas, the length is in the order of twenty or more times larger than the base in fibers produced according to the present invention. With the length being substantially longer than the base, the included angle at the apex is significantly smaller resulting in virtually no fiber breakage at the apex. This is not true with conventional fiber producing equipment because the large apex angle causes a high incidence of breakage at the interface of the apex and fiber itself.

The fabrication cost of bushings is relatively low compared to conventional bushings which usually cost hundreds and even thousands times more. Thus frequent replacements can be afforded, and the cheapest bushing assemblies, such as those made from nickel-chromium alloys, may be used. Because of the small mass of glass being processed in any instant through each bushing, and because a tubular bushing is an ideal configuration to withstand stress, it can withstand freezing or expanding of the glass inside. The power used to melt the glass therefore can be turned on or off at will without damage to the bushing. Only several minutes are required to heat apparatus according to the invention to fiber drawing temperature, or conversely to cool it to a handling temperature. A bushing can be changed within several minutes to replace a defective, worn out, or accidentally clogged bushing, or to change assemblies for different types of glass.

Because of such features described above, it is now possible to supply fiber glass almost on instant demand. It is practical to use apparatus according to the invention as the primary unit of a vertically integrated production line. Through the use of a plurality of bushings as shown in FIG. 7 and glass rods for example, fibers can be made at the head of a factory line at the demand of a laminating machine rather than at some remote factory which would necessitate the fibers being spooled, packaged, shipped, received, and otherwise handled. Not only is a substantial savings involved, but the laminates are considerably stronger since the strength of the laminate is substantially increased if the fibers are encapsulated within the plastic matrix seconds after the fibers are made.

In view of the continuous nature of extruding filaments according to this invention and since the twelve thousand two hundred and forty fiber producing orifices for a sixty end roving can be grouped within a very small area, such as underneath or near the forehearth of a small glass furnace, it is now practical to continuously wind the full roving directly onto shippable spools and eliminate the elaborate and costly rewinding of many ends which is done conventionally.

The present invention enables ready experimentation because of the low overall cost, highly simplified and miniaturized aspect, quick cooling and heating facility, quick change utility of the bushing assembly, and the fact that by rotating the bushing or bushings after separation is achieved, fibers can be pulled upwards, sidewise, etc. The low radiation losses coupled with no obscuring insulation makes it possible intimately to observe or to photograph the fibers as they are being extruded.

It will be apparent that since the bushings are relatively small and easy to make many exotic and extremely high temperature materials such as tungsten, columbium, molybdenum, etc., can be used economically in the construction thereof. Welding, which is notoriously difficult with such materials, is not required. If tubing is not available, it can be made on a lathe from solid rod. The inert atmosphere required by oxidizable materials can be conveniently and inexpensively obtained simply by placing a slightly larger tube 70 as shown in FIG. 8 coaxially around a bushing 71. The tube 70 may have an opening 72 at the orifice area of the bushing 71, and a slow flow of inert gas may be introduced in the chamber between the tube 70 and bushing 71 to egress through the slot 72 at the orifice area.

High temperature oxidizable metals can be readily utilized in the experimental and production fabrication of exotic, high temperature and high strength filaments while still retaining the convenient handling characteristics as well as the facility for close experimental observation allowed by bushing assemblies made from non-oxidizing material. Thus, it is possible by using the concept of the present invention to produce higher temperature, higher modulus, and higher strength fibers than have heretofore been possible.

What is claimed is:

1. In a method of producing fibers from glass comprising the steps of feeding the glass under a nominal pressure head to a bushing having a plurality of closely spaced orifices, heating said bushing to maintain the glass in liquid form at least at the orifice region, egressing the glass through the orifices, the improvement comprising, feeding the glass to said bushing, said bushing being arcuate and the orifices being sufficiently closely spaced that the glass egressing through said orifices will coalesce and flood the bushing at the bushing level when only a nominal pressure head of approximately one p.s.i. of molten glass acts upon said orifices, and operating at a pressure head of glass acting on said orifices substantially above said nominal pressure head to prevent recoalescing while still maintaining separation of said streams.

2. In a method of producing fibers from glass comprising the steps of feeding the glass under pressure to a bushing having a plurality of closely spaced orifices, heating said bushing to maintain the glass in liquid form at least at the orifice region, egressing the glass through said orifices, and collecting the streams of glass egressing through the orifices, the improvement comprising, feeding the glass to said bushing, said bushing being arcuate and the orifices being sufficiently closely spaced that the glass egressing through said orifices will coalesce and flood the bushing at the bushing level when only a first nominal pressure head of molten glass sufficient to cause the glass to flow acts upon said orifices, increasing the pressure head of glass acting on said orifices to a second pressure head substantially greater than said first pressure head, said second pressure head being greater than approximately five p.s.i. to overcome the effect of surface tension of the glass to cause rapid separation of the glass into discrete streams, and maintaining said second pressure head sufficiently high and substantially above said first pressure head to prevent recoalescing, while still maintaining separation of said streams of glass.

3. A method of producing fibers from a glass rod comprising the steps of heating an arcuate bushing having a group of closely spaced orifices to a temperature sufficient to melt said rod adjacent said orifices, forcing said rod into an end of said bushing, melting said rod within said bushing as a result of said temperature, exerting high force on said rod to apply a pressure to the liquid glass of at least five p.s.i. to cause the liquid glass within said bushing to egress through said orifices as individual streams, and collecting fibers from said glass egressing through said orifices.

4. A method as in claim 3 wherein the pressure applied to the liquid glass is at least approximately fifty p.s.i.

5. A method of producing fibers from glass rods comprising the steps of heating an arcuate bushing having a group of closely spaced orifices intermediate the ends thereof to a temperature sufficient to melt the ends of said glass rods adjacent said orifices, forcing said glass rods into the respective ends of said bushing, melting said rods within said bushing as a result of said temperature, exerting force on said rods to apply a pressure to the liquid glass of at least approximately five p.s.i. to cause the liquid glass within said bushing to egress through said orifices as individual streams, and collecting fibers from said glass egressing through said orifices.

6. A method of producing fibers from molten glass comprising the steps of applying molten glass within a plurality of closely spaced confining zones, said confining zones having a predetermined length to diameter ratio, applying sufficient pressure to flow said molten glass through said zones and to form separate streams, said pressure and length to diameter ratio being such as to maintain the dwell time of molten glass in said zones less than approximately 25 milliseconds, and collecting fibers from said molten glass flowing through said zones.

7. Apparatus for producing fibers from a high temperature meltable material comprising manifold means for receiving said material in a liquid state, a plurality of feeder means coupled with said manifold means for receiving said liquid material from said manifold means, a plurality of bushing means coupled respectively with said feeder means for receiving said liquid material from said feeder means, each of said bushing means comprising an arcuate member having a group of simple holes intermediate the ends thereof through which said material can be forced under pressure to form separate streams, said holes being closely spaced with respect to each other, means for supplying pressure to force said liquid material through said holes, and support means coupled with said bushing means for supplying electrical current through said bushing means to maintain said material in a liquid state within at least the portion of said bushing means at said holes, and for removing heat from the end of each of said bushing means remote from said feeder means for causing said material to solidify and provide a seal at said remote end.

8. Apparatus as in claim 7 wherein each of said bushing means comprises a cylindrical tube, and said group of holes is confined to a small area, the ratio of number of holes to area being at least approximately several hundred holes per square inch.

9. Apparatus for producing fibers from glass comprising an arcuate bushing means, said bushing means having a group of orifices, said orifices being closely spaced with respect to each other and being intermediate the ends of said bushing means, means coupled with said bushing means for supplying electrical current through said bushing means for melting said glass in the vicinity of said orifices, and pressure means for forcing said glass into an end of said bushing means for causing said glass to melt within said bushing means as a result of the temperature of said bushing means by current therein and to force said melted glass to egress through said orifices as individual streams, said pressure means causing a pressure of greater than approximately five p.s.i. to be applied to said melted glass.

10. Apparatus as in claim 9 wherein said bushing means is cylindrical.

11. Apparatus for producing fibers from glass comprising means including a plurality of feeder means with means to deliver glass thereto in liquid form under pressure, each of said feeder means having an end, a plurality of bushing means having at least a first end in mating engagement with said end of the respective feeder means for receiving said liquid glass from said feeder means, each of said bushing means being arcuate and including a group of simple holes intermediate the ends thereof through which said glass can be forced under pressure to form separate streams, said holes being closely spaced with respect to each other, and movable means coupled with said bushing means for maintaining said bushing means in engagement with said feeder means and for enabling disengagement of said bushing means from said feeder means.

12. Apparatus for producing fibers from molten glass comprising bushing means for continually extruding discrete glass fibers, said means comprising a wall member having an arcuate cross-sectional configuration, said wall member having a plurality of closely spaced orifices extending therethrough for allowing the passage of molten glass, and means for exerting a pressure of greater than approximately five p.s.i. on said molten glass to force said molten glass through said orifices and to form said discrete fibers.

13. An apparatus as in claim 12 including cover means for said bushing means for providing a gas flow chamber between said bushing means and said cover means, said cover means having an opening exposing said orifices to the atmosphere, and means coupled with said bushing means and said cover means for supplying gas through said chamber to said opening.

14. In an apparatus for producing fibers from glass comprising glass feeder means and bushing means coupled therewith, said bushing means having a wall with a group of closely spaced passages extending through said wall through which said glass egresses, said passages defining an orifice area, the interior of said wall receiving said glass in a liquid state under pressure for allowing said glass to egress through said passages, the improvement comprising, said wall being thin and having an arcuate cross section, the exterior of said wall at said orifice area having a substantially convex curvature with at least the central portion of said orifice area extending in the direction of glass egress, said wall having a configuration which withstands the temporary very high pressure of greater than approximately five p.s.i. required to cause rapid separation and to withstand the continued high pressure required to maintain separation of said glass into discrete streams from said orifices.

15. Apparatus as in claim 14 wherein said bushing means comprises a cylindrical member.

16. Apparatus as in claim 14 wherein the lengths of said passages are less than several times the diameters thereof, and said high pressure is greater than approximately fifty p.s.i.

17. Apparatus as in claim 14 wherein at least one hundred of said passages are included within an orifice area of approximately one square inch.

18. In a fiber forming bushing through which glass fibers are extruded under high pressure, the improvement comprising a cylindrical tube having a plurality of closely spaced passages extending through the wall thereof through which said glass egresses to form fibers, at least one hundred of said passages defining an orifice area of one square inch.

19. A bushing as in claim 18 wherein said tube is at least partially composed of a nickel-chromium alloy.

20. A bushing as in claim 18 wherein said tube is at least partially composed of molybdenum.

References Cited

UNITED STATES PATENTS

| 1,536,821 | 5/1925 | Devers | 65—2 |
| 1,579,019 | 3/1926 | Miller | 65—2 |
| 2,383,168 | 8/1945 | Slayter | 65—1X |
| 2,453,864 | 11/1948 | Schlehr | 65—1X |
| 2,465,283 | 3/1949 | Schlehr | 65—2UX |
| 2,495,956 | 1/1950 | Cook | 65—1X |

S. LEON BASHORE, Primary Examiner

R. L. LINDSAY, JR., Assistant Examiner

U.S. Cl. X.R.

18—8; 65—2, 11, 374; 264—13